US011572476B2

(12) United States Patent
Wang et al.

(10) Patent No.: US 11,572,476 B2
(45) Date of Patent: Feb. 7, 2023

(54) ANTI-REFLECTIVE COATING

(71) Applicant: Rohm and Haas Electronic Materials LLC, Marlborough, MA (US)

(72) Inventors: Deyan Wang, Hudson, MA (US); Sheng Liu, Bow, NH (US)

(73) Assignee: ROHM AND HAAS ELECTRONIC MATERIALS LLC, Marlborough, MA (US)

( * ) Notice: Subject to any disclaimer, the term of this patent is extended or adjusted under 35 U.S.C. 154(b) by 435 days.

(21) Appl. No.: 16/790,017

(22) Filed: Feb. 13, 2020

(65) Prior Publication Data

US 2020/0263041 A1    Aug. 20, 2020

Related U.S. Application Data

(60) Provisional application No. 62/805,994, filed on Feb. 15, 2019.

(51) Int. Cl.
| | | |
|---|---|---|
| C04B 16/08 | (2006.01) |
| C08K 7/22 | (2006.01) |
| C08F 2/46 | (2006.01) |
| C08F 2/50 | (2006.01) |
| C08G 61/04 | (2006.01) |
| C09D 5/00 | (2006.01) |
| C08K 7/26 | (2006.01) |
| C08L 83/04 | (2006.01) |
| C08L 47/00 | (2006.01) |
| C08G 18/73 | (2006.01) |
| C08G 18/76 | (2006.01) |
| C08G 77/385 | (2006.01) |
| C08K 5/1515 | (2006.01) |
| C08K 5/095 | (2006.01) |
| C08F 220/18 | (2006.01) |
| C08K 5/05 | (2006.01) |
| C08K 5/06 | (2006.01) |
| C08K 5/07 | (2006.01) |
| C08K 3/36 | (2006.01) |

(52) U.S. Cl.
CPC ............ *C09D 5/006* (2013.01); *C08F 2/50* (2013.01); *C08F 220/18* (2013.01); *C08G 18/73* (2013.01); *C08G 18/7621* (2013.01); *C08G 77/385* (2013.01); *C08K 3/36* (2013.01); *C08K 5/05* (2013.01); *C08K 5/06* (2013.01); *C08K 5/07* (2013.01); *C08K 5/095* (2013.01); *C08K 5/1515* (2013.01); *C08K 7/26* (2013.01); *C08L 47/00* (2013.01); *C08L 83/04* (2013.01); *C08K 2201/005* (2013.01); *C08L 2203/16* (2013.01); *C08L 2312/06* (2013.01)

(58) Field of Classification Search
CPC ...... C08L 83/04; C08L 47/00; C08L 2203/16; C08L 2312/06; C08F 220/18; C08F 2/50; C08F 230/085; C08G 77/385; C08G 77/24; C08G 18/73; C08G 18/7621; C09D 183/06; C09D 183/08; C09D 5/006; C09D 175/16; C09D 4/06; C09D 7/70; C08K 3/36; C08K 5/095; C08K 5/1515; C08K 5/05; C08K 5/07; C08K 5/06; C08K 7/26; C08K 2201/011; C08K 2201/005
USPC ...... 106/409, 401, 400; 522/6, 189, 184, 71, 522/1; 520/1
See application file for complete search history.

(56) References Cited

U.S. PATENT DOCUMENTS

| | | |
|---|---|---|
| 2017/0131439 A1 | 5/2017 | Kobori et al. |
| 2017/0343704 A1 | 11/2017 | Kim et al. |
| 2018/0051148 A1 | 2/2018 | Kim et al. |

FOREIGN PATENT DOCUMENTS

| | | | | |
|---|---|---|---|---|
| JP | 2010254950 A | 11/2010 | | |
| WO | 2008032722 A1 | 3/2008 | | |
| WO | WO-2008032722 A1 * | 3/2008 | ............. | G02B 1/111 |
| WO | WO-2017122953 A1 * | 7/2017 | ............. | B32B 27/08 |

OTHER PUBLICATIONS

Suwa et al, WO 2008032722 Machine Translation, Mar. 20, 2008 (Year: 2008).*
Kim et al, WO 2017/122953 Machine Translation, Jul. 20, 2017 (Year: 2017).*

* cited by examiner

*Primary Examiner* — Jessica Whiteley
(74) *Attorney, Agent, or Firm* — Shaorong Chen

(57) ABSTRACT

There is provided a curable composition for forming an anti-reflective film. The composition includes: (a) hollow silica nanoparticles; (b) a siloxane binder having reactive groups; (c) at least one additional material having reactive groups; (d) an initiator; and (e) solvent. The siloxane binder is present in an amount that is at least 50% by weight of the total weight of (siloxane binder+additional materials having reactive groups). The weight ratio of hollow silica nanoparticles to the total of (siloxane binder+additional materials having reactive groups) is no greater than 1.75 to 1.

8 Claims, No Drawings

ANTI-REFLECTIVE COATING

FIELD OF THE DISCLOSURE

The present invention relates to curable compositions for anti-reflective coatings, particularly for display devices.

BACKGROUND INFORMATION

Anti-reflective (AR) coatings on the topmost surfaces of display devices have become increasingly important in the display industry. This is particularly true in order to achieve an enhanced viewing experience, especially in a strong ambient light environment. Besides functioning as an anti-reflective coating, this layer of film is also expected to behave as an anti-scratch coating with anti-fingerprint properties. Essentially, this is an ultrathin hardcoat on mobile device surfaces. The film thickness (FT) is selected to ensure that the reflected light rays from the top and the bottom surfaces of the AR film are opposite in phase, i.e. the phase difference is 180°, so that the rays reflected from the top and the bottom surfaces interfere destructively to cancel each other. If the magnitude of the reflected light from the top and the bottom surfaces is the same, there is no reflected light to the target wavelength. The AR coating needs to have a low refractive index in order to achieve this.

There is a continuing need for AR coatings which have improved properties.

SUMMARY OF THE INVENTION

There is provided a curable composition for forming an anti-reflective coating, said composition comprising:
  (a) hollow silica particles;
  (b) a siloxane binder having reactive groups;
  (c) at least one additional material having reactive groups;
  (d) an initiator; and
  (e) solvent;
wherein:
  (i) the siloxane binder is present in an amount that is at least 50% by weight of the total weight of (siloxane binder+additional materials having reactive groups); and
  (ii) the weight ratio of hollow silica particles to the total of (siloxane binder+additional materials having reactive groups) is no greater than 1.75.
There is further provided an anti-reflective film made by:
  (1) coating the above curable composition onto a substrate to form an uncured film;
  (2) drying the uncured film to form a dried uncured film;
  (3) exposing the dried uncured film to one or both of UV radiation and heat to form the AR film.
There is further provided an electronic device having the above anti-reflective film thereon.

Definitions

As used herein, the term "binder" is intended to mean a material that holds together particles and other materials, and that provides mechanical strength and uniform consistency.

The term "curable" as it applies to a composition, is intended to mean a material that becomes harder and less soluble in solvents when exposed to radiation and/or heat.

The term "hollow silica particles" is intended to mean silica particles having voids on the surface and/or inside the particles.

The term "(meth)acrylate" is intended to mean a group which is either an acrylate or a methacrylate.

The term "polyhedral" is intended to mean a caged structure having polygonal faces.

The term "porosity" as it refers silica particles, is intended to mean the volume of voids as a percent of the total volume of the particles.

The term "reactive group" is intended to mean a group capable of polymerization or crosslinking when exposed to radiation and/or heat.

The term "siloxane" is intended to mean a material having a molecular structure based on a chain of alternating silicon and oxygen atoms, with organic groups attached to the silicon atoms.

The term "silsesquioxane" is intended to mean a siloxane compound with the chemical formula $[RSiO_{1.5}]_n$ where n is an even integer and R can be H or an organic functional group. R can be the same or different at each occurrence.

The term "solvent" is intended to mean an organic compound that is a liquid at room temperature. The term is intended to encompass a single organic compound or mixture of two or more organic compounds.

All ranges are inclusive and combinable. For example, the term "a range of 50 to 3000 cPs, or 100 or more cPs" would include each of 50 to 100 cPs, 50 to 3000 cPs and 100 to 3000 cPs.

In this specification, unless explicitly stated otherwise or indicated to the contrary by the context of usage, where an embodiment of the subject matter hereof is stated or described as comprising, including, containing, having, being composed of or being constituted by or of certain features or elements, one or more features or elements in addition to those explicitly stated or described may be present in the embodiment. An alternative embodiment of the disclosed subject matter hereof, is described as consisting essentially of certain features or elements, in which embodiment features or elements that would materially alter the principle of operation or the distinguishing characteristics of the embodiment are not present therein. A further alternative embodiment of the described subject matter hereof is described as consisting of certain features or elements, in which embodiment, or in insubstantial variations thereof, only the features or elements specifically stated or described are present.

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. In addition, the materials, methods, and examples are illustrative only and not intended to be limiting.

To the extent not described herein, many details regarding specific materials, processing acts, and circuits are conventional and may be found in textbooks and other sources within the photoresist, organic light-emitting diode display, photodetector, photovoltaic cell, and semiconductive member arts.

DETAILED DESCRIPTION

The curable compositions described herein are useful for forming anti-reflective ("AR") films. The curable compositions can be coated onto a device or substrate and cured to form the AR film. It has been found that such films have improved scratch resistance. It has further been found that such films have improved anti-fingerprint properties.

The curable composition comprises:
(a) hollow silica particles;
(b) a siloxane binder having reactive groups;
(c) at least one additional material having reactive groups;
(d) an initiator; and
(e) solvent.

The curable composition includes hollow silica particles. The hollow silica particles can be of any shape or may be amorphous. In some embodiments, the hollow silica particles are spherical or tubular.

In some embodiments, the hollow silica particles have a porosity of about 10-75%; in some embodiments 40-60%.

In some embodiments, the majority of the voids in the hollow silica particles are inside the particles; in some embodiments, substantially all of the voids are inside the particles.

In some embodiments, the hollow silica particles have particle size less than 1 µm; in some embodiments, less than 500 nm. In some embodiments, the number average particle size is in the range of 10 nm to 500 µm; in some embodiments, 50 nm to 250 µm.

Hollow silica particles are readily available commercially.

In some embodiments, the hollow silica particles are present in an amount of 30-80% by weight, based on the total weight of solids in the curable composition; in some embodiments, 35-70% by weight; in some embodiments, 40-65% by weight. As used herein, the total weight of solids in the curable composition is considered to be the weight of the composition minus the weight of solvent.

The curable composition includes a siloxane binder having reactive groups. In some embodiments, the curable composition is free of non-silicon-containing binders. By "non-silicon-containing" refers to materials in which no Si atoms are present.

In some embodiments, the siloxane binder is selected from the group consisting of silsesquioxanes, oligomeric siloxanes, polymeric siloxanes, and combinations thereof.

In some embodiments, the siloxane binder is a polyhedral oligomeric silsesquioxane ("POSS"). The POSS may have 6, 8, 10 or 12 Si vertices, corresponding to "n" in the formula $[RSiO_{1.5}]_n$. In some embodiments, n=8. In some embodiments, POSS is a mixture of polyhedra, having 6-12 vertices.

In some embodiments, the siloxane binder is a siloxane oligomer. In some embodiments, the siloxane oligomer has fluorine substituents. In some embodiments, the siloxane oligomer has a fluorine content of 1-25%, by weight.

In some embodiments, the siloxane oligomer has no fluorine substituents.

In some embodiments, the siloxane oligomer has a weight-average molecular weight, Mw, of 1000-10,000.

The siloxane binder has at least one reactive group. In some embodiments, the siloxane binder has multiple reactive groups. In some embodiments, 50-100% of Si atoms are bonded to a reactive group; in some embodiments, 75-100%.

In some embodiments, the reactive group is selected from the group consisting of acrylate, methacrylate, vinyl, epoxide, isocyanate, and combinations thereof.

In some embodiments, the reactive group on the siloxane binder is acrylate or methacrylate.

One specific example of a siloxane binder having reactive groups is acrylo-POSS. Acrylo-POSS is a mixture of caged structures having 8, 10, and 12 Si atoms, and each Si atom is bonded to an acrylopropyl group. Additional siloxane binders having reactive groups are shown in the Examples.

In some embodiments, the siloxane binder having reactive groups is present in an amount of 15-70% by weight, based on the weight of solids in the curable composition; in some embodiments, 30-60% by weight; in some embodiments, 40-50% by weight.

The curable composition includes at least one additional material having reactive groups. In some embodiments, the additional material having reactive groups is selected from the group consisting of monomers, oligomers, surfactants, and combinations thereof. The reactive groups can be any of those described above.

In some embodiments, the additional material having reactive groups is a monomer. The monomer has a molecular weight, Mw, of less than 1000; in some embodiments, less than 750.

In some embodiments, the monomer has two or more acrylate or methacrylate groups.

In some embodiments, the monomer has two or more diisocyanate groups.

In some embodiments, the monomer has two or more epoxide groups.

Some specific examples of monomers include, but are not limited to dipentaerythritol penta(meth)acrylate, trimethylolpropane tri(meth)acrylate, ethylene glycol di(meth)acrylate, xylene diisocyanate, hexamethylene diisocyanate, ethylene glycol diglycidyl ether, and combinations thereof.

In some embodiments, the monomer is present in an amount of 0-15% by weight, based on the weight of solids in the curable composition; in some embodiments, 0-10% by weight; in some embodiments, 0-5% by weight.

In some embodiments, no monomer is present in the curable composition.

In some embodiments, the additional material having reactive groups is an oligomer. In some embodiments, the oligomer is selected from the group consisting of (meth)acrylates, urethane-modified (meth)acrylates, polyester (meth)acrylates, epoxide (meth)acrylates, ether (meth)acrylates, and mixtures thereof.

In some embodiments, the additional material having reactive groups is a (meth)acrylate oligomer.

In some embodiments, the oligomer having reactive groups has a weight-average molecular weight, Mw, of 1000-10,000.

In some embodiments, the oligomer having reactive groups is present in an amount of 1.5-7.0% by weight, based on the weight of solids in the curable composition; in some embodiments, 3.0-6.0% by weight; in some embodiments, 4.0-5.0% by weight.

In some embodiments, the additional material having reactive groups is a surfactant. In some embodiments, the additional material having reactive groups is a fluorosurfactant. In some embodiments, the fluorosurfactant has a fluorine content of 1-25% by weight.

In some embodiments, the surfactant having reactive groups is present in an amount of 0.1-5.0% by weight, based on the weight of solids in the curable composition; in some embodiments, 0.5-1.0% by weight.

Surfactants and fluorosurfactants are well-known in the art and available commercially.

The curable composition includes an initiator. The initiator is present to generate an active species which initiates the polymerization and/or crosslinking of the reactive groups in the curable composition.

In some embodiments, the initiator is a photoinitiator. Any known photoinitiator can be used. Some examples of photoinitiators include, but are not limited to aromatic ketones, acetophenones, benzoins, benzoin ethers, and onium salts. In some embodiments, combinations of photoinitiators are used.

In some embodiments, the initiator is a thermal initiator. Any know thermal initiator can be used. Some examples of thermal initiators include, but are not limited to azo compound, peroxides, persulfates, and redox initiators. In some embodiments, combinations of thermal initiators are used.

In some embodiments, both a photoinitiator and a thermal initiator are present in the curable composition.

In some embodiments, the total amount of initiator present is 0.5-5% by weight, based on the weight of solids in the curable composition; in some embodiments, 1-3% by weight.

The curable composition includes a solvent. Any solvent can be used in the curable composition as long as the other components dissolve or disperse sufficiently such that the composition can be coated to form a film. In some embodiments, the solvent is selected from the group consisting of ketones, alcohols, acetates, ethers, combinations thereof, and mixtures thereof.

Some specific examples of solvents include, but are not limited to, methyl isobutyl ketone, i-butanol, propylene glycol methyl ether acetate, tetrahydrofuran, and the like.

In some embodiments, the solvent is present in an amount such that the total solid content of the curable composition is 1% to 50% by weight; in some embodiments, 10% to 30% by weight.

In some embodiments of the curable compositions described herein, the weight of the siloxane binder is at least 50% of the total weight of materials having reactive groups. That means that the siloxane is 50% of the total weight of (siloxane binder having reactive groups+oligomer having reactive groups+surfactant having reactive groups+monomer having reactive groups+any other materials having reactive groups). In some embodiments, the siloxane binder is at least 60% of the total weight of materials having reactive groups; in some embodiments, at least 70%; in some embodiments, at least 80%; in some embodiments, at least 90%.

In some embodiments of the curable compositions, the weight ratio of hollow silica particles to the total weight of materials having reactive groups is no greater than 1.75; in some embodiments, no greater than 1.6; in some embodiments, no greater than 1.5; in some embodiments, no greater than 1.4.

The curable compositions described herein are useful for making AR films. The process to make the AR film comprises:
(1) coating the above curable composition onto a substrate to form an uncured film;
(2) drying the uncured film to form a dried uncured film;
(3) exposing the dried uncured film to one or both of UV radiation and heat to form the AR film.

Any known liquid deposition process can be used to coat the curable composition onto the substrate. Such processes include, but are not limited to slot die coating, spin coating, spray coating, bar coating, dip coating, and gravure coating.

The substrate can be any one on which an AR coating is desired. The substrate can be glass or a polymeric material.

In some embodiments, the uncured film is dried by heating. In some embodiments, the drying temperature is 50-120° C.; in some embodiments, 70-100° C. In some embodiments, the drying time is 30 seconds to 2 minutes.

In some embodiments, the dried uncured film is cured by exposure to UV radiation. The exact exposure conditions will depend on the nature of the photoinitiator in the curable composition. In general, broadband UV radiation can be used with an exposure time of several seconds.

In some embodiments, the dried uncured film is cured by heating. In some embodiments, the heating temperature is 150-250° C.; in some embodiments, 175-225° C. In some embodiments, the heating time is 30-120 minutes.

In some embodiments, the dried uncured film is cured by exposure to UV radiation and by heating. In some embodiments, the dried uncured film is first exposed to UV radiation and then heated. The exposure and heating conditions are as described above.

The thickness of the AR film is generally in the range of 1-2000 nm; in some embodiments, 10-1500 nm; in some embodiments 50-1000 nm; in some embodiments 50-500 nm; in some embodiments 100-200 nm. The film thickness should satisfy the following optical relationship with a target wavelength in a visible spectrum:

$$FT = k(\lambda/4)$$

where:
$\lambda = \lambda_o/n$
$\lambda_o$ is the targeting wavelength in vacuum,
n is the refractive index of the AR coating, and
k is an odd integer The targeting wavelength in the visible spectrum is chosen as 555 nm which corresponds to the most sensitive color (yellowish green) to human eyes.

The AR films described herein have a low refractive index. In some embodiments, the refractive index is less than 1.5; in some embodiments, less than 1.4; in some embodiments, less than 1.3.

The AR films described herein have high visible light transmittance. In some embodiments, the transmittance is greater than 90%; in some embodiments, greater than 95%.

The AR films described herein have a high contact angle with water. In some embodiments, the contact angle is greater than 100°; in some embodiments, greater than 110°; in some embodiments, greater than 115°. The high contact angle results in improved anti-smudge and anti-fingerprint properties.

The AR films described herein have improved scratch-resistance. This is shown further in the Examples.

The AR films can be used in any application where the AR property is desired. In some embodiments, the AR films are used on the topmost surface of display devices.

EXAMPLES

The concepts described herein will be further illustrated in the following examples, which do not limit the scope of the invention described in the claims.

Materials:
DU-1008=DU-1008SIV, hollow silica particles, from Catalysts and Chemicals Ltd. (Japan); this material is provided as a 20% dispersion in methyl isobutyl ketone ("MIBK").
Acrylo POSS=POSS with acrylate functional groups, from Hybrid Plastics (USA).
KY-1203=fluorosurfactant from ShinEtsu USA (Japan); this material is provided as a 20% solution in MIBK.
DAC-HP=Optool DAC-HP, fluorosurfactant from Daikin (Japan); this material is provided as a 20% solution in 1,1,2,2,3,3,4-heptafluorocyclopentane and PGME.
SR399=Dipentaerythritol pentaacrylate from Sartomer (USA)
LED02=Mercapto modified polyester acrylate, from Allnex (USA)

KTO=Esacure KTO 46, a free radical photoinitiator from IGM (USA)
Ebecryl=Ebecryl 8602, an aliphatic urethane acrylate oligomer from Allnex
Photomer=Photomer 4356, a triacrylate monomer from IGM (USA)
TfBDMBA=thermal acid generator, from E&I Korea Test Methods Contact Angle Contact angles of the AR coating surface to water were determined using a KRUSS drop shape analyzer (model 100). In this test, the water drop size was 1 to 2 μl.

Refractive Index

This was determined using a laboratory refractometer.

Marker Test

This is a qualitative test for the oleophobicity of an AR film. The marker used was a Sharpie permanent marker of red, blue or black color. This test is baselined with a surface that is not treated for anti-fingerprint property. Such a surface is drawable with the marker to show a clear and sharp marker trace. An AR coating with good anti-fingerprint property is not drawable with the marker showing ink aggregation by forming droplets along a drawing line.

Steel Wool Test

This test was performed using a TABER Industries' 5900 Reciprocating Abraser. The steel wool used in the test was from Nippon Steel Wool Co. Ltd. In this test, 1 kg force is used on a 2×2 cm$^2$ testing area on the AR film, with a stroke length of 5 cm and stroke rate of 1 cycle/second.

Synthesis Example 1

This examples illustrates the preparation of a fluorinated siloxane binder, SB-1.

To a 100 ml round bottom flask were added 4.5383 g of acryloxylpropyl trimethoxysilane, 10.5331 g of nonafluorohexyl trimethoxysilane, 2.5350 g of DI water, 0.8262 g of acetic acid, 10.1202 g of cyclopetanol and 0.0358 g of butylated hydroxytoluene ("BHT"). The flask was connected to a condenser and the content of the flask was heated to 80° C. and maintained at 80° C. for 6 hours with stirring. 10 g of cyclopentanol was then added to the flask. The slightly cloudy solution was then rotovaped at 50° C. to remove methanol, acetic acid and water. 10 ml of propylene glycol methyl ether acetate ("PGMEA") was then added to the solution to obtain a clear uniform solution of the fluorinated siloxane material, SB-1.

Using a weight loss method, the solid content of SB-1 was found to be 53.0%.

Synthesis Example 2

This examples illustrates the preparation of a siloxane binder, SB-2.

To a 100 ml round bottom flask were added 18.5672 g of acryloxylpropyl trimethoxysilane, 16.4758 g of tetraethyl orthosilicate ("TEOS"), 8.9860 g of DI water, 1.7723 g of acetic acid and 0.0308 g of BHT. The flask was connected to a condenser and the content of the flask was heated to 80° C. and maintained at 80° C. for 2 hours with stirring.

35 g of PGMEA were then added to the flask. The solution was rotovaped at 50° C. to remove methanol, ethanol, acetic acid and water.

Using a weight loss method, the solid content of the siloxane binder SB-2 was found to be 53.85%.

Synthesis Example 3

This examples illustrates the preparation of a siloxane binder, SB-3.

To a 100 ml round bottom flask were added 30.1587 g of acryloxylpropyl trimethoxysilane, 7.3297 g of DI water, 1.8534 g of acetic acid and 0.0300 g of BHT. The flask was connected to a condenser and the content of the flask was heated to 80° C. and maintained at 80° C. for 2 hours with stirring.

40 g of PGMEA were then added to the flask. The solution was rotovaped at 50° C. to remove methanol, acetic acid and water.

Using a weight loss method, the solid content of the siloxane binder SB-3 was found to be 48.7%.

Examples 1 and 2

This example illustrates the improvement in contact angle with water, when the films were cured with both UV exposure and thermally. The siloxane SB-1 from Synthesis Example 1 was used.

(a) 4.0712 g of DU-1008SIV were diluted to 16.0804 g with PGMEA to form a 5% solution.

(b) 0.6499 g of Ebecryl 8602 were diluted to 12.9879 g of PGMEA to form a 5% solution. To this was added 0.0260 g of Esacure KTO 46.

(c) 8.3523 g of solution (a) and 2.1142 g of solution (b) were mixed and the following two formulations were made:

| Example 1 | Example 2 | |
|---|---|---|
| 5.0095 g | 5.3404 g | solution (c) |
| 0.0521 g | 0.0888 g | SB-1 solution |

The resulting solvent was a mixture of MIBK and PGMEA. The final amounts of each component of the curable compositions are given in Table 1 below.

TABLE 1

| | Solids composition (grams) | | | |
|---|---|---|---|---|
| Sample | h-SiO$_2$ | SB-1 | Ebecryl | KTO46 |
| Ex. 1 | 0.202 | 0.028 | 0.0506 | 0.00202 |
| Ex. 2 | 0.215 | 0.047 | 0.0540 | 0.00215 | h-SiO2 is the weight of hollow silica solids; SB-1 is the weight of siloxane binder The Example 1 and 2 solutions were, respectively, filtered with 1.0 μm PTFE syringe filters 3 times and then spin coated on 8" silicon wafers at 1500 rpm. Coated wafers were baked at 90° C. for 60 sec to dry the films. The wafer was then cleaved into two halves with one half being cured under broadband UV radiation only and the other half UV plus thermal cured (200° C. for 1 hour). The film contact angles (CA) and refractive indices (RI) were measured and the results are given in Table 2.

TABLE 2

| Sample | Curing | CA | RI |
|---|---|---|---|
| Ex. 1 | UV only | 99.2° | 1.288 |
| Ex. 1 | UV + thermal | 125.1° | 1.288 |
| Ex. 2 | UV only | 100.9° | 1.288 |
| Ex. 2 | UV + thermal | 127.6° | 1.287 |

CA = contact angle with water;
RI = refractive index

This example shows the improvement (increase) in contact angle when both UV and thermal curing were used.

Example 3

This example illustrates the preparation of an AR film, using the siloxane binder SB-2, from Synthesis Example 2.
(a) 30.0536 g of the binder solution from Synthesis Example 2 was diluted to 64.8297 g with PGMEA to form a 25% solution. To this solution were added 0.8280 g of Esacure KTO 46, 1.6916 g LED 02, 0.4091 g of TfBDMBA thermal acid generator, and 1.6059 g KY 1203 fluorosurfactant.
(b) 3.0319 g DU-1008SIV was mixed with 1.6015 g of (a) (above). The solids composition of (b) is summarized below, where the amounts are in g.

| Hollow silica | 0.606 |
|---|---|
| SB-2 solids | 0.374 |
| LED02 | 0.0391 |
| KTO | 0.0192 |
| TfBDMBA | 0.0094 |
| Fluorosurfactant | 0.0074 |

In the above composition:
Siloxane binder percent of total weight of materials having reactive groups=89
Hollow silica/total reactive materials=1.44
Formulation (b) was filtered with a 1.0 μm PTFE syringe filter 3 times and then spin coated on 8" silicon wafers at 1000 rpm. Coated wafers were baked at 90° C. for 60 sec to dry the films. The coated wafer was cleaved into two halves with one half being cured with broadband UV only and the other half with UV plus thermal (200° C./1 hr). Film contact angles with water were measured as 103° and 120°, respectively, for the films cured by UV only and UV plus thermal.
For the film with UV curing only, the marker test was rated good.
For the film with both UV plus thermal curing, the marker test was rated excellent.

Example 4

This example illustrates the preparation of an AR film, using the siloxane binder SB-3, from Synthesis Example 3.
(a) 8.3421 g of the siloxane oligomer SB-3 from Synthesis Example 3 was diluted to 16.2630 g with PGMEA to form a 25% solid solution. To this solution were added 0.2097 g of Esacure KTO 46 photoinitiator, 0.4086 g LED 02 acrylate oligomer, 0.4069 g of KY 1203 fluorosurfactant, and 1.0093 g of SR399 monomer.
(b) 3.0158 g DU-1008SIV were mixed with 1.6025 g of a (above). The solids composition of (b) is summarized below, where the amounts are in g of solid.

| Hollow silica | 0.603 |
|---|---|
| SR399 | 0.0884 |
| SB-3 solids | 0.356 |
| LED02 | 0.0356 |
| KTO | 0.0184 |
| fluorosurfactant | 0.0071 |

In the above composition:
Siloxane binder percent of total weight of materials having reactive groups=73
Hollow silica/total reactive materials=1.24
Formulation (b) was filtered with a 1.0 μm PTFE syringe filter 3 times and then spin coated on 8" silicon wafers at 1000 rpm. Coated wafers were baked at 90° C. for 60 sec to dry the films. The coated film was cured with UV plus thermal at 150° C. for 30 min. Film contact angle was measured 110°, and the water contact angle became 102° after steel wool test for 250 cycles or 500 times under 1 kg loading with 2×2 cm² contact area.
For the film with UV curing only, the marker test was rated good.
For the film with both UV plus thermal curing, the marker test was rated excellent.
A second sample was treated as above, except that the thermal curing was carried out at 200° for 1 hour. This film showed a water contact angle of 115°.

Example 5 and Comparative Example A

This example illustrates the preparation of an AR film.
Compositions were prepared in a manner analogous to that described above, and summarized in Table 3, below. In both cases, the weight ratio of the hollow silica to the total of all materials having reactive groups is 1.3.

TABLE 3

| | Solids composition (grams) | | | | | | |
|---|---|---|---|---|---|---|---|
| Sample | h-SiO₂ | monomer | A-POSS | LED02 | KTO | Fluoro-surfactant | A-POSS % |
| Comp. A | 0.705 | 0.235 | 0.237 | 0.0476 | 0.0234 | 0.0096 | 44.8 |
| Ex. 5 | 0.705 | 0 | 0.471 | 0.0478 | 0.0236 | 0.0097 | 89.1 | h-SiO₂ = hollow silica solids; monomer = SR399; A-POSS = Acrylo POSS; fluorosurfactant = solids from KY-1203; A-POSS % is the weight of Acrylo-POSS as a percentage of the total weight of all materials with reactive groups (monomer + A-POSS + LED02 + fluorosurfactant)

Each of the above two formulations has a total solid content of 21.55%, which was filtered, respectively, with a 1.0 μm PTFE syringe filter 3 times and then spin coated on 8" silicon wafers at 1000 rpm. Coated wafers were baked at 90° C. for 60 sec to dry the films. The coated films were UV cured under nitrogen atmosphere, and then thermal cured at 150° C. for 30 min (in air). Water contact angles were measured initially and at different stages of the steel wool test (1 kg loading with 2×2 cm² contact area) as summarized in Table 4 below.

TABLE 4

Test results

| | | Water Contact Angle | | | |
| | | After Steel Wool Cycles | | | |
| Sample | Initial | 500 | 1000 | 1500 | 2000 |
|---|---|---|---|---|---|
| Comp. A | 111.9° | 106.3° | 104.7° | — | — |
| Ex. 5 | 112.3° | 108.8° | 107.2° | 105.3° | 101.9° |

— indicates that the contact angle could not be measured due to severe scratching damage to the film It can be seen that the scratch resistance is greatly improved in the Example 5 film, where the weight of silicone binder is greater than 50% of the total weight of materials having reactive groups.

Examples 6 and 7 and Comparative Examples B-D

These examples illustrate the preparation of AR films having different ratios of hollow silica to total materials having reactive groups.

Compositions were prepared in a manner analogous to that described above, and summarized in Table 5, below.

TABLE 5

Solids composition (grams)

| Sample | h-SiO$_2$ | A-POSS | LED02 | KTO46 | Fluoro-surfactant |
|---|---|---|---|---|---|
| Comp. B | 1.08 | 0.131 | 0.0131 | 0.0065 | 0.0098 |
| Comp. C | 0.96 | 0.261 | 0.0261 | 0.0131 | 0.0096 |
| Comp. D | 0.84 | 0.392 | 0.0392 | 0.0196 | 0.0096 |
| Ex. 6 | 0.72 | 0.523 | 0.0523 | 0.0261 | 0.0101 |
| Ex. 7 | 0.60 | 0.654 | 0.0654 | 0.0327 | 0.0096 | h-SiO$_2$ = hollow silica solids;
A-POSS = Acrylo POSS;
fluorosurfactant = solids from KY-1203

Each formulation was filtered with a 1.0 μm PTFE syringe filter 3 times and then spin coated on 8″ silicon wafers at 1000 rpm. Coated wafers were baked at 90° C. for 60 seconds to dry the films. The coated films were broadband UV cured under nitrogen atmosphere, and then thermally cured at 150° C. for 30 min (in air). Water contact angles were measured initially and after 500 cycles of the steel wool test (1 kg loading with 2×2 cm$^2$ contact area). The results are summarized in Table 6 below.

TABLE 6

Results

| | | | Water Contact Angle | | |
| Sample | A-POSS % | h-SiO$_2$/total acrylate | Initial | 500 cycles | % CA loss |
|---|---|---|---|---|---|
| Comp. B | 85 | 7.0 | 52.0° | 35.4° | 32 |
| Comp. C | 88 | 3.2 | 67.0° | 42.4° | 37 |
| Comp. D | 89 | 1.9 | 72.4° | 54.6° | 25 |
| Ex. 6 | 89 | 1.2 | 112.3° | 108.8° | 3.1 |
| Ex. 7 | 90 | 0.82 | 111.2° | 107.1° | 3.7 |

A-POSS % is the weight of Acrylo-POSS as a percentage of the total weight of all materials with reactive groups (A-POSS + LED02 + fluorosurfactant);
h-SiO$_2$/total acrylate = weight ratio of hollow silica to the total weight of all materials with reactive groups (A-POSS + LED02 + fluorosurfactant);
% CA loss = percent change in contact angle relative to the initial contact angle It can be seen from Table 6, that the initial contact angle and the scratch resistance are both greatly decreased when the ratio of hollow silica to the total weight of material having reactive groups is greater than 1.75.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination. The use of numerical values in the various ranges specified herein is stated as approximations as though the minimum and maximum values within the stated ranges were both being preceded by the word "about." In this manner, slight variations above and below the stated ranges can be used to achieve substantially the same results as values within the ranges. Also, the disclosure of these ranges is intended as a continuous range including every value between the minimum and maximum average values including fractional values that can result when some of components of one value are mixed with those of different value. Moreover, when broader and narrower ranges are disclosed, it is within the contemplation of this invention to match a minimum value from one range with a maximum value from another range and vice versa.

What is claimed is:

1. A curable composition for forming an anti-reflective film, said composition comprising:
    (a) hollow silica nanoparticles;
    (b) a siloxane binder having reactive groups;
    (c) at least one additional material having reactive groups;
    (d) an initiator; and
    (e) solvent;
    wherein:
    (i) the siloxane binder is present in an amount that is 50% to 90% by weight of the total weight of the siloxane binder and the additional materials having reactive groups; and
    (ii) a weight ratio of the hollow silica nanoparticles to the total of the siloxane binder and the additional materials having reactive groups is 0.82 to 1.44;
    wherein the additional material (c) comprises an oligomer selected from the group consisting of (meth)acrylate oligomers, urethane-modified (meth)acrylate oligomers, polyester (meth)acrylate oligomers, epoxide (meth)acrylate oligomers, ether (meth)acrylate oligomers, and mixtures thereof.

2. The curable composition of claim 1, wherein the siloxane binder (b) is selected from the group consisting of siloxane polymers, silsesquioxanes, and combinations thereof.

3. The curable composition of claim 1, wherein the additional material (c) further comprises a fluorinated surfactant.

4. The curable composition of claim 1, wherein the initiator (d) is selected from the group consisting of photoinitiators, thermal initiators, and combinations thereof.

5. The curable composition of claim 1, wherein the siloxane binder is present in an amount that is 60% to 90% by weight of the total weight of the siloxane binder and the additional materials having reactive groups.

6. An anti-reflective film made by the process of:
   (1) coating the curable composition of claim 1 onto a substrate to form an uncured film;
   (2) drying the uncured film to form a dried uncured film; and
   (3) exposing the dried uncured film to one or both of UV radiation and heat to form the anti-reflective film.

7. The anti-reflective film of claim 6, wherein the dried uncured film is exposed in sequence to UV radiation and heat.

8. An electronic device having thereon the anti-reflective film of claim 6.

* * * * *